(12) United States Patent
Kline (10) Patent No.: US 8,945,255 B2
(45) Date of Patent: Feb. 3, 2015

(54) JET ENGINE WITH DEFLECTOR

(71) Applicant: Michael J Kline, Marietta, GA (US)

(72) Inventor: Michael J Kline, Marietta, GA (US)

( * ) Notice: Subject to any disclaimer, the term of this patent is extended or adjusted under 35 U.S.C. 154(b) by 0 days.

(21) Appl. No.: 13/874,731

(22) Filed: May 1, 2013

(65) Prior Publication Data
US 2013/0294894 A1    Nov. 7, 2013

Related U.S. Application Data

(62) Division of application No. 13/462,181, filed on May 2, 2012, now Pat. No. 8,657,895.

(51) Int. Cl.
*B01D 39/00* (2006.01)
*F01D 17/10* (2006.01)
*F02C 7/055* (2006.01)

(52) U.S. Cl.
CPC .............. *F01D 17/10* (2013.01); *F02C 7/055* (2013.01); *F05D 2250/15* (2013.01); *F05D 2250/25* (2013.01); *Y02T 50/672* (2013.01)
USPC .......................................................... 55/309

(58) Field of Classification Search
USPC ..................... 55/306; 415/151, 208.1, 121.2
See application file for complete search history.

(56) References Cited

U.S. PATENT DOCUMENTS

| | | | |
|---|---|---|---|
| 2,928,497 A * | 3/1960 | Stockdale | ......................... 55/306 |
| 3,121,545 A * | 2/1964 | Meletion | ..................... 244/53 B |
| 3,871,844 A | 3/1975 | Calvin, Sr. | |
| 4,149,689 A | 4/1979 | McDonald | |
| 4,354,346 A | 10/1982 | Wooding | |
| 5,411,224 A | 5/1995 | Dearman et al. | |
| 5,549,259 A | 8/1996 | Herlik | |
| D433,029 S | 10/2000 | Eidson | |
| 6,138,950 A | 10/2000 | Wainfan et al. | |
| 6,193,011 B1 | 2/2001 | Harris | |
| 6,289,815 B1 | 9/2001 | Tougeron et al. | |
| 6,598,384 B1 | 7/2003 | Adkins | |
| D614,560 S | 4/2010 | Alexander | |
| 7,691,162 B2 | 4/2010 | McCahill et al. | |
| D621,852 S | 8/2010 | Zunik | |
| 7,803,204 B1 | 9/2010 | Mladinich | |
| D631,420 S | 1/2011 | Locklear | |
| 7,871,455 B1 | 1/2011 | Sands et al. | |
| 7,887,610 B2 | 2/2011 | Pavlatos | |
| 7,927,404 B2 * | 4/2011 | Kemoun | ......................... 95/269 |
| 8,052,083 B1 | 11/2011 | Moran | |
| 8,052,767 B2 | 11/2011 | Sands et al. | |
| 8,117,820 B1 | 2/2012 | Briscoe | |
| 8,285,136 B2 | 10/2012 | Tsujiyama | |
| 2003/0033795 A1 | 2/2003 | Lo | |
| 2009/0016872 A1 * | 1/2009 | Anghileri | ................... 415/121.2 |
| 2010/0158684 A1 | 6/2010 | Baralon | |
| 2011/0185700 A1 | 8/2011 | Newcomer | |

FOREIGN PATENT DOCUMENTS

EP    1841212    10/2007

* cited by examiner

*Primary Examiner* — Dung H Bui
(74) *Attorney, Agent, or Firm* — Baker & Hostetler LLP (57) ABSTRACT

A deflector for a jet engine. The deflector may prevent the jet engine from ingesting birds during a bird strike scenario. The deflector may include a series of ribs, spokes, or vanes that may vary in width and/or thickness from fore to aft, and/or may be curvilinear in one or more planes of view, and/or may serve double duty as inlet vanes for redirecting inlet air.

14 Claims, 6 Drawing Sheets

JET ENGINE WITH DEFLECTOR

CROSS REFERENCE TO RELATED APPLICATIONS

The present application is a divisional of pending U.S. application Ser. No. 13/462,181, filed May 2, 2012, entitled "Jet Engine Deflector", the content of which is incorporated herein by reference in its entirety.

TECHNICAL FIELD

This disclosure relates in general to deflector apparatus and in particular to deflector apparatus for use with turbine engines such as aircraft power plants and the like.

BACKGROUND

The problems caused by ingestion of foreign objects into the air inlet of jet engines have long been recognized in the art. This problem is particularly acute with jet engines used on aircraft, since such engines are operated in an environment where foreign objects cannot be removed or controlled. The engines of jet aircraft taxiing on the ground frequently ingest foreign objects such as tools and other small metal objects, while a jet aircraft in flight is susceptible to ingestion of birds, leaves, paper, and other airborne debris.

The ingestion of almost any solid foreign object into the air inlet of a jet engine causes damage to the compressor stages, and possibly to other portions of the engine. This engine damage is immediately manifested by a partial or complete loss of available engine thrust, with consequent impairment of aircraft flying ability.

The problem of bird ingestion into jet engines is particularly acute during aircraft take-off, where an aircraft may fly through a flock of birds at precisely the time when maximum available thrust is required for a safe take-off. Since many commercial and private jet-powered aircraft have only two engines, it will be appreciated that a partial loss of power in both engines, or a total loss of power in one engine, occurring during or shortly after take-off can have drastic consequences. Post-crash investigations have proved that numerous jet aircraft crashes, resulting in loss of life and extensive property damage, are directly attributable to bird ingestion which occurred during or shortly after take-off.

According to FAA statistics, there have been over 100,000 (Civil and USAF) wildlife strikes between 1990 and 2008, and the number of strikes has climbed steadily since 1990. In 1990, the industry saw 1,738 bird strikes; in 2007, the number had increased to 7,666. Some of that trend is due to increased air travel, but the frequency of wildlife strikes has tripled from 0.527 to 1.751 per 10,000 flights.

Bird strikes, particularly of the jet's engines, can have catastrophic consequences. On Oct. 4, 1960, Eastern Air Lines Flight 375 was struck by a flock of European starlings during take-off. All four engines were damaged and the aircraft crashed in the Boston harbor. There were 62 fatalities.

Although FAA regulations require that jet engines be designed to permit continued operation after ingesting a bird of specified size at a specified aircraft speed, such design has not eliminated bird strikes causing engine damage and/or failure. On Jan. 15, 2009, a double bird strike involving Canadian geese impacted U.S. Airways Flight 1549, an Airbus A320-214, about three minutes after take-off from La Guardia airport, when the airplane was at an altitude of 2,818 feet AGL (above ground level). The bird strike resulted in an immediate and complete loss of thrust to both engines, forcing the crew to ditch the plane in the Hudson River.

FAA statistics report that 92% of bird strikes occur at or below 3,000 feet AGL, thus at a critical point of takeoff or landing. Proposed ground-based wildlife abatement programs, such as radar detection of bird flocks and use of lights, noise makers, and water cannons are of little to no use in abating bird strikes at altitudes such as Flight 1549 experienced, or higher altitudes.

The increase in bird strikes has resulted in regular reports of commercial jets being forced to make emergency landings shortly after takeoff. According to FAA statistics, gulls are the most common type of bird to strike aircraft, accounting for 19% of the birds identified in bird strikes. Doves and pigeons are the second most common, accounting for 15% of the birds identified in bird strikes. But as Flight 1549 proves, bird strikes of larger birds such as Canada geese can also occur, with devastating consequences.

There are many factors contributing to increasing rates of bird strikes by commercial and military aircraft. These factors include: 1) As jet travel replaced the noisier and slower piston-powered aircraft, the chance of these jets colliding with wildlife increased; 2) Along with the change in mode of travel there has been an increase in air traffic worldwide, both military and commercial; 3) Natural habitat surrounds many modern airports and this habitat provides shelter, nesting area, and feeding areas for wildlife that is not usually present in the surrounding metropolitan area; 4) Many of the world's busiest airports, including Washington Reagan National, Philadelphia International, New York La Guardia, and Boston Logan International, are near large bodies of water that create the aforementioned natural habitats for large water fowl such as geese and ducks; 5) Wildlife conservation measures generally serve to increase the populations of native birds. These factors result in a majority of wildlife strikes occurring within the immediate airport environment. According to FAA statistics, over $600 million dollars annually is lost due to wildlife strikes with civil aircraft in the United States alone.

The term "jet engine" as used herein is intended to include various types of engines which take in air at a relatively low velocity, heat the air through combustion, and expel the air at a much higher velocity. The term "jet engine" includes turbojet engines and turbofan engines, for example.

A jet engine conventionally comprises a compressor section for compression of the intake air, a combustion section for combustion of the compressed air and a turbine section arranged behind the combustion chamber, the turbine section being rotationally connected to the compressor section in order to drive this by means of the energy-rich gas from the combustion chamber. The compressor section usually comprises a low-pressure compressor and a high-pressure compressor. The turbine section usually comprises a low-pressure turbine and a high-pressure turbine. The high-pressure compressor is rotationally locked to the high-pressure turbine via a first shaft and the low-pressure compressor is rotationally locked to the low-pressure turbine via a second shaft.

In the aircraft jet engine, stationary guide vane assemblies are used to turn the flow from one angle to another. The stationary guide vane assembly may be applied in a stator component of a turbo-fan engine at a fan outlet, in a Turbine Exhaust Case (TEC) and in an Inter-Mediate Case (IMC).

SUMMARY

According to an embodiment of the disclosure, there may be provided a deflector comprising a plurality of radially disposed spokes, the spokes being curvilinear in at least two planes of view.

According to another embodiment of the disclosure, there may be provided a deflector comprising a plurality of radially disposed ribs, spokes, or vanes including a narrower section proximate the forward end of the deflector, transitioning to a wider section proximate the aft end of the deflector.

According to another embodiment of the invention, there may be provided a deflector comprising a plurality of radially disposed ribs, spokes, or vanes including a thicker section proximate the forward end of the deflector, transitioning to a thinner section proximate the aft end of the deflector.

According to another embodiment of the invention, there may be provided a deflector comprising a plurality of radially disposed ribs, spokes, or vanes including one or more air inlet holes.

According to another embodiment of the disclosure, there may be provided a jet engine with an air inlet deflector, the air inlet deflector including an attachment ring attached to a structural frame of the jet engine proximate the air inlet thereof; a plurality of curvilinear vanes, each vane being curvilinear in at least two planes of view and connected at their rearward ends to the attachment ring; and a central hub positioned at the forward most end of the deflector, each of the curvilinear vanes being attached to the central hub.

According to another embodiment of the disclosure, there may be provided a method of preventing ingestion of flying debris by an air inlet, the method comprising mounting a plurality of radially spaced rib members about the air inlet; providing adjoining rib members with a maximal spacing that precludes ingestion of flying debris of a predetermined size through the maximal spacing; and configuring the rib members so as to turn incoming air from a direction generally normal to the air inlet to a direction that is at least partially radial with respect to the air inlet.

These and other features of the present disclosure will become apparent to one of ordinary skill in the art upon review of the following detailed description when taken in conjunction with the drawings and the appended claims.

DETAILED DESCRIPTION OF ILLUSTRATIVE EMBODIMENTS

Figure 1:
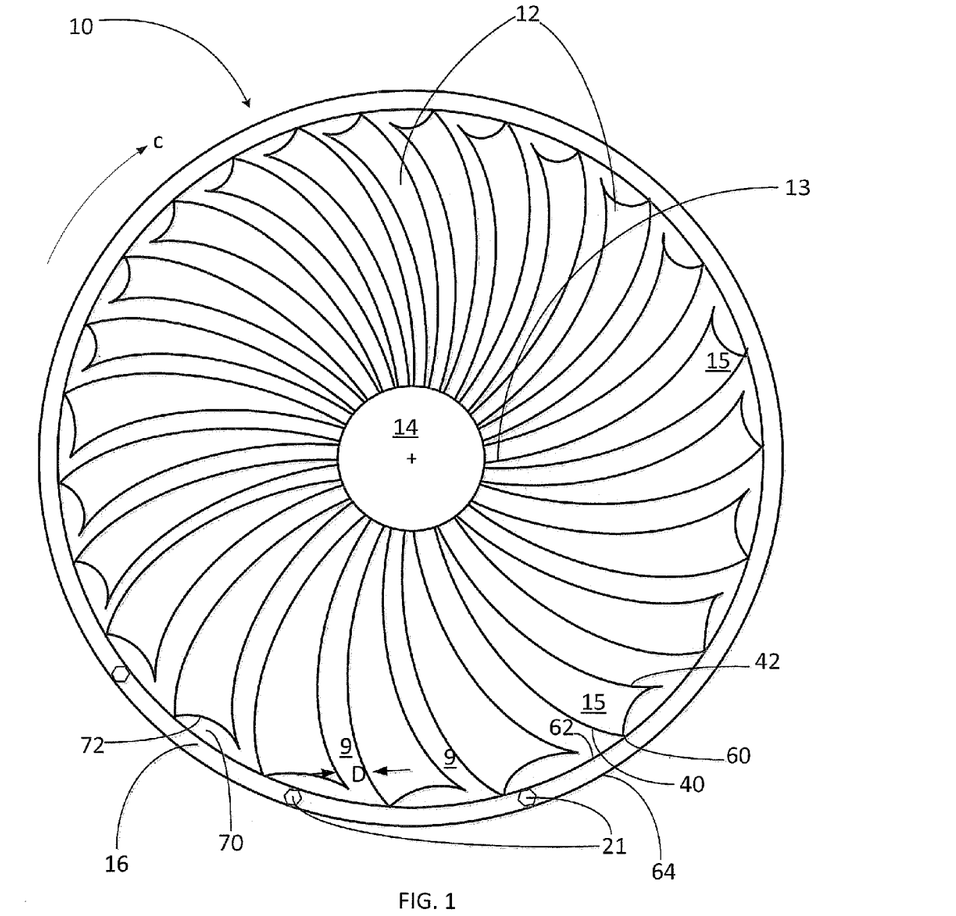
FIG. 1 is a schematic representation of a frontal view of a deflector of the present disclosure.
Figure 2:
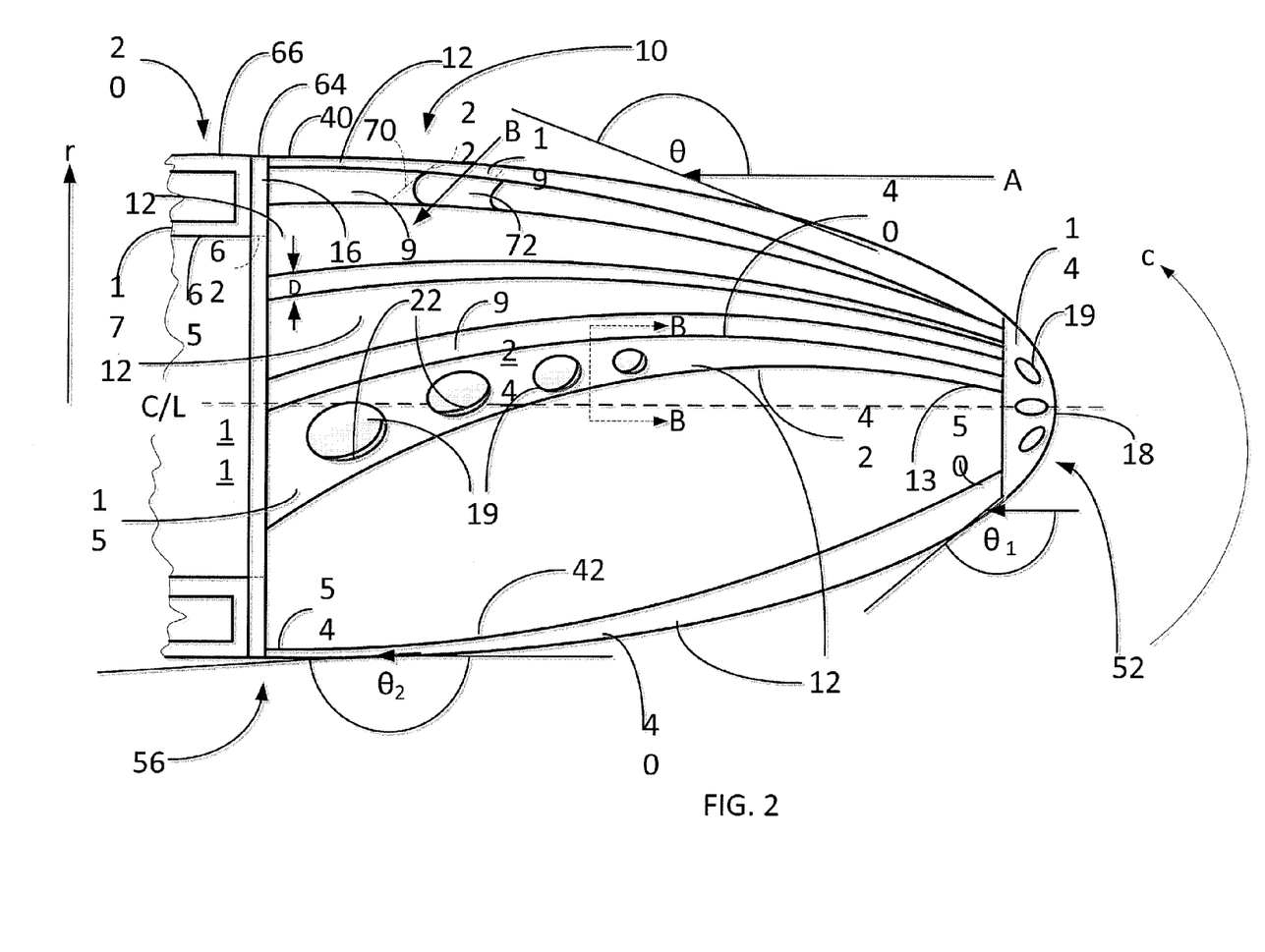
FIG. 2 is a schematic representation of a side view of a jet engine deflector system of the present disclosure.

Referring now to FIGS. 1 and 2, there are illustrated embodiments of a deflector of the disclosure, generally 10. As illustrated, the deflector 10 may comprise a series of generally radially disposed ribs, spokes, or vanes 12 arranged circumferentially about the inlet 11 of a jet engine, generally 20. The ribs, spokes, or vanes 12 may be arranged about and connected to a central hub 14.

As further illustrated in FIG. 2, the ribs, spokes, or vanes 12 may provide the deflector 10 with an elongated, generally smooth profile that may present a generally oblique angle $\theta$ relative to the direction of air flow into the engine, as illustrated by the arrow A. The embodiment illustrated in FIG. 2 is highly elongated, and not necessarily representative of the degree of elongation that would be employed in actual use, where cost and weight of materials must be minimized wherever feasible. The oblique angle $\theta$ makes it more likely that a bird or other debris striking the deflector 10 will be deflected away from the air inlet 11 of the jet engine 20 to which the deflector 10 is mounted, and not become lodged or wedged within the air inlet openings 9 between adjacent ribs, spokes, or vanes 12.

The configuration of the ribs, spokes, or vanes 12 illustrated in FIG. 2 is elliptical in profile, although other shapes, including conical, parabolic, hyperbolic, semi-oval, semi-spherical, and the like providing an oblique angle $\theta$ to the direction of impact/incoming air flow are of course possible as will now be readily apparent to those of ordinary skill in the art. As illustrated, the ribs, spokes, or vanes 12 may be separated from each other by a distance that widens slightly fore to aft, but preferably the widest distance D between adjacent ribs, spokes, or vanes 12 is small enough to prevent a large, heavy bird, such as a Canada goose, from getting through to the air inlet 11 upon impact. The widest distance D may also be small enough to present birds the size of a gull or pigeon, the most common birds ingested in bird strikes, from being ingested, although modern jet engines are typically designed to be able to handle ingestion of smaller birds.

As illustrated, the ribs, spokes, or vanes 12 may be curvilinear in two planes, as represented in FIGS. 1 and 2, which may create a spiraling effect. This arrangement may beneficially direct the incoming air from a direction that is generally normal to the air inlet, to a generally spiral direction (i.e., having a rotational component), which may assist in rotating the intake fan and/or compressor and/or turbine to a greater extent than would occur without the ribs, spokes, or vanes 12 so oriented. Thus, the ribs, spokes, or vanes 12 may act as stationary inlet air guide vanes, serving double duty as components of a deflector, as well as guide vanes acting as a stator for turning incoming air in a direction contributing to rotation of the fan, compressor(s) and/or turbine(s).

The ribs, spokes, or vanes 12 may vary in width proximate the fore end, generally 52 of the deflector 10 to the aft end generally 56, as illustrated, with the ribs, spokes, or vanes having a narrower fore end 13 and wider aft end 15. The use of ribs, spokes, or vanes 12 that widen in the circumferential direction "c" from fore to aft, as illustrated in FIGS. 1 and 2, may reduce or eliminate the need for cross bar supports between ribs, spokes, or vanes 12, or added ribs, spokes, or vanes proximate the wider end of the deflector as it nears the engine inlet 11, which supports and/or added ribs, spokes, or vanes may tend to impede air intake and/or increase drag and/or increase weight of the deflector and therefore the engine. It may, however, be desirable in certain configurations, particularly for jet engines of larger diameter, to include cross bar supports between adjacent ribs, spokes, or vanes 12.

As illustrated in FIG. 2, the ribs, spokes, or vanes 12 may have a relatively thicker region 50 proximate the fore end, generally 52 of the deflector 10, and may taper to a relatively thinner region 54, proximate the aft end, generally 56 of the deflector 10. Thus, the ribs, spokes, or vanes 12 may become relatively, generally, or progressively thinner in the radial direction "r," from fore to aft.

Such difference in thickness may contribute to minimizing weight of the ribs, spokes, or vanes 12, while providing greater thickness and therefore material and strength in the regions most needed, for example, the regions of the ribs, spokes, or vanes proximate the narrower fore end 13, while providing less thickness and less material at the wider aft end 15 of the ribs, spokes, or vanes 12. Providing greater thickness, material, and strength in the thicker region 50 may help mitigate structural damage to the deflector 10 upon impact with birds or other debris, as the fore end 52 of the deflector 10 is more likely to receive both the initial impact, and receive such an impact at a relatively smaller (i.e., more direct) angle of incidence, $\theta_1$ compared to the angle of incidence $\theta_2$ proximate the aft end 56 of the deflector 10, as illustrated by the arrows in FIG. 2.

As illustrated in FIG. 2, one or more or all of the ribs, spokes, or vanes 12 and/or central hub 14 may be further configured with one or more air inlet holes 19. Such air inlet holes 19, when applied to the ribs, spokes, or vanes 12, may be spaced along the entire length thereof, or may be positioned proximate the wider aft end 15. The air inlet holes 19 may further improve air intake through the deflector 10 to the jet engine, generally 20. The air inlet holes 19 as illustrated in FIG. 2 may be elliptical in shape, and may increase in size fore to aft as illustrated. Of course other shapes for the inlet holes 19, such as round, square, rectangular, oval, slotted, or combinations of these and other shapes may be employed. The size of the air inlet holes 19 may be small enough to preclude ingestion of large birds, such as Canada geese, or even smaller birds, such as pigeons and starlings. In addition to providing more area for air intake, the air inlet holes 19 may reduce the weight of the ribs, spokes, or vanes 12 and/or the central hub 14.

Figure 4:
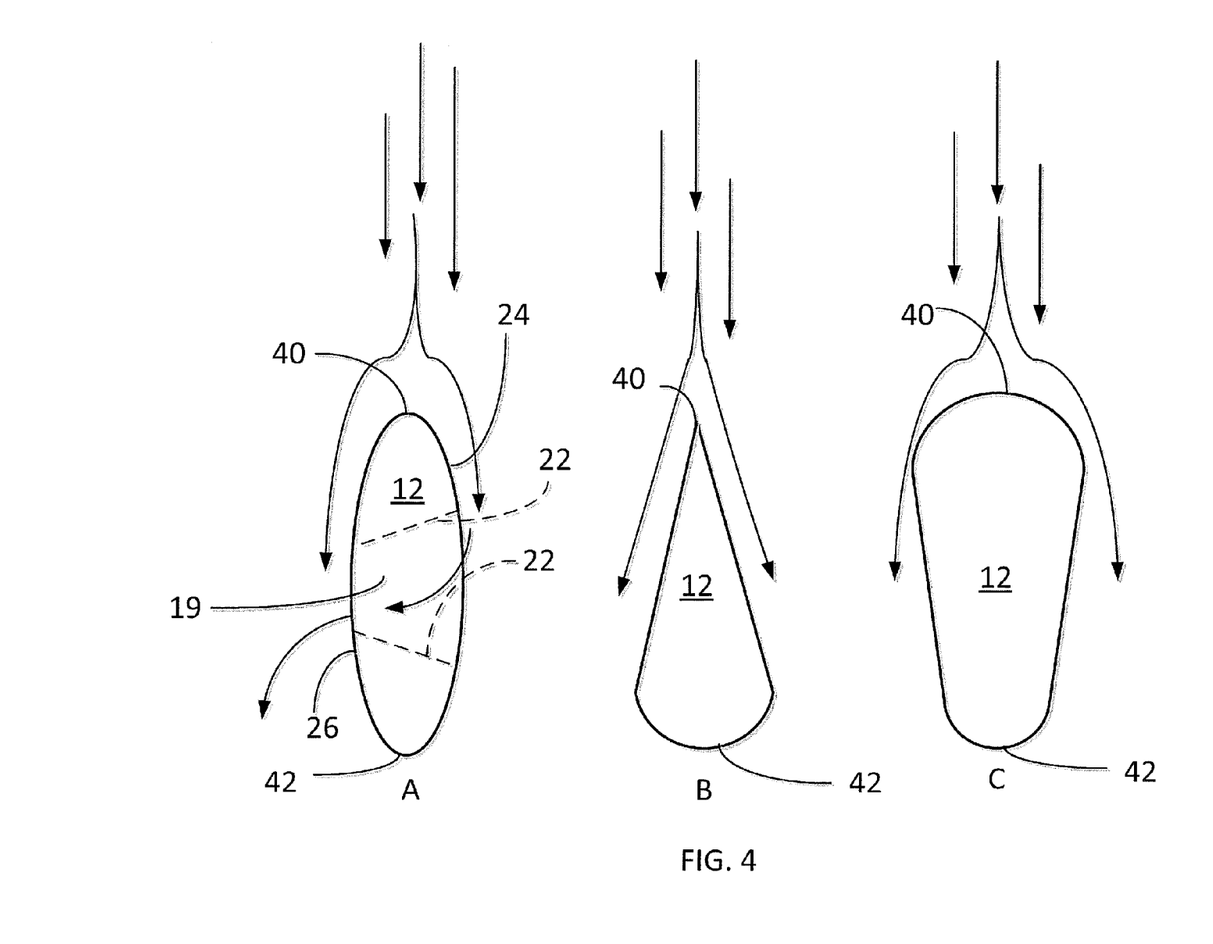
FIGS. 4A-C are cross sectional views of exemplary deflector rib, spoke, or vane configurations as viewed along broken lines B-B of FIG. 2.

The air inlet holes 19 may include directional side walls 22 that redirect the air passing along boundary layers near the outer surface 24 of the ribs, spokes, vanes, and/or central hub 14 through the holes 19 along a desired flow path, e.g., axially in the direction of the fan and/or compressor, or with a rotational component as previously discussed. FIG. 4A illustrates one example of directional side walls 22 that may tend to direct air passing through the air inlet hole 19 from the outer surface 24 of the rib, spoke, or vane 12 through the air inlet hole 19 and along the inner surface 26 of the rib, spoke, or vane 12 as illustrated by the directional arrows. As illustrated, the air inlet hole directional side walls 22 may be tapered, which may contribute to imparting a nozzle effect to the air exiting the air inlet holes 19. Although the side walls 22 as illustrated have a generally inwardly tapered conical configuration, other configurations, e.g. cylindrical, or outwardly flaring conical, may also be used, depending on the application.

As illustrated, the ribs, spokes, or vanes 12 may be attached to an attachment ring 16. The attachment ring 16, in turn, may be attached to the frame 17 of a jet engine, generally 20, as illustrated in FIG. 2, using suitable fasteners 21, according to accepted air frame standards. Such fasteners 21 may be equally spaced about the circumference and/or perimeter of the attachment ring 16. Although the fasteners 21 illustrated in FIG. 2 may be bolts or screws, other acceptable fasteners known to those of ordinary skill in the art may be used, and may be configured to permit removal of the deflector 10 for engine maintenance.

As illustrated in FIG. 1, the ribs, spokes, or vanes 12 may be connected to the attachment ring 16 at an attachment point 60 proximate the leading edge 40 and the wider aft end 15. In the embodiment illustrated, the attachment point 60 may be attached to the inner wall 62 of the attachment ring 16. Such an attachment may permit greater air intake in the region proximate the wider aft end 15 than might be possible if the entire width of the wider aft end 15 is attached to the inner wall 62 of the attachment ring 16, as air may flow through the space 70 between the inner wall 62 of the attachment ring and outer end 72 of the spoke or vane 12.

The inner wall 62 of the attachment ring 16 may be sized to align with the inner wall 65 of the air inlet 11 to the jet engine 20 to which the deflector 10 is mounted, to further maximize incoming air, and/or mitigate the effect to which the attachment ring 16 may block incoming air. Other attachment configurations are of course possible, including attaching the wider aft end 15 of the ribs, spokes, or vanes 12 to the inner wall 62 of the attachment ring 16 across the entire width of the wider aft end 15 of the ribs, spokes, or vanes 12, as illustrated schematically in FIG. 6.

Figure 6:
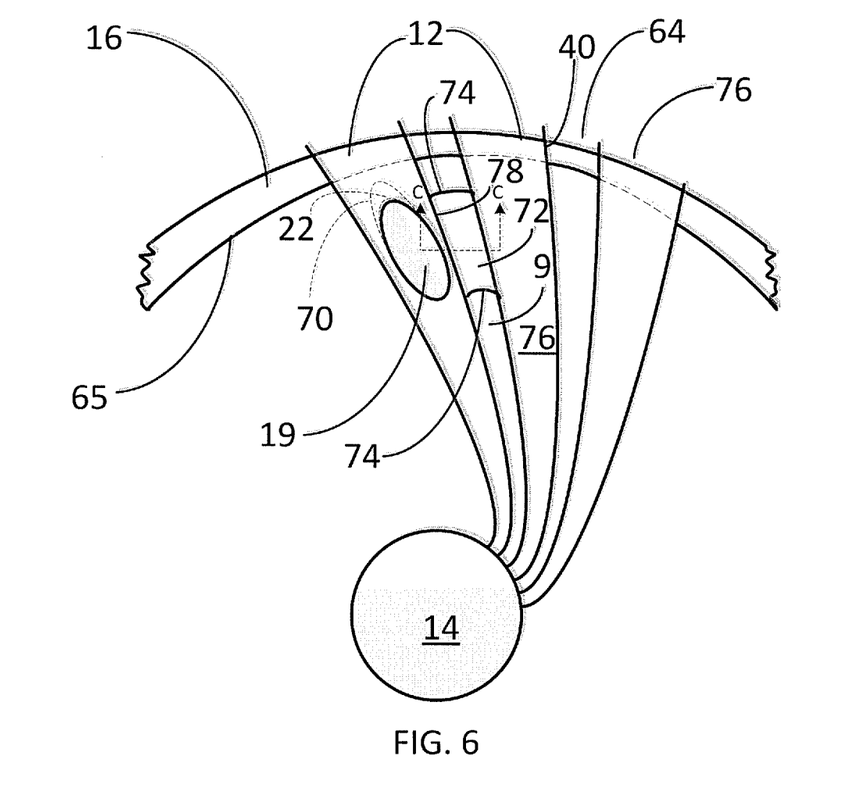
FIG. 6 is a partial frontal view of another deflector of the present disclosure.

Another attachment configuration is illustrated in FIGS. 2 and 6, where the ribs, spokes or vanes 12 may be connected to the attachment ring 16 proximate the outer wall 64 thereof. As illustrated, the outside or leading edges 40 of the ribs, spokes, or vanes 12 may be attached to the attachment ring 16 such that the leading edges 40 blend aerodynamically with the outer wall 64 of the attachment ring 16 and the outer surface or cowling 66 of the jet engine 20. In the embodiment illustrated in FIG. 6, the trailing edge 42 and the outboard surface 76 of the ribs, spokes, or vanes 12 may also blend aerodynamically with the outer wall 64 of the attachment ring 16 and the outer surface or cowling 66 of the jet engine 20 at the aft end 56 of the deflector 10, which configuration may be achieved by imparting a slight twist to the rib, spoke, or vane 12 proximate the aft end 56.

Here it may be recognized that the portion of the deflector 10 that resides outboard of the inner wall 65 of the air inlet 11 may have little to no negative impact on air intake to the jet engine 20, and indeed may actually contribute to greater air intake, for example through the use of larger air inlet holes 19 proximate the aft end 56, particularly if such air inlet holes have directional side walls 22 to direct airflow inboard of the inner wall 65, as illustrated in FIGS. 2 and 6. As there illustrated, the side walls 22 of the air inlet holes 19 that are positioned outboard of the inner wall 65 of the air inlet 11 may further include a vane member 70 that may extend radially inwardly. This vane member 70, in combination with the directional side wall 22, may cause air to be redirected from a direction substantially normal to the air inlet 11 but outboard thereof, as represented by arrow A, to a direction with a radial component, thereby directing the air inboard of the inner wall 65 so it may be ingested by the air inlet 11, as illustrated by arrow B.

Further, as illustrated in FIGS. 2 and 6, the deflector 10 may include in the air inlet openings 9 between adjoining ribs, spokes, or vanes 12 one or more directional vanes 72 to further assist in directing air toward the air inlet 11. The directional vanes 72 may comprise flat or curved members. Such directional vanes 72, in addition to providing for redirecting the air in the direction B, may further contribute to structural integrity of the deflector 10 by serving as a connector between adjoining ribs, spokes, or vanes 12.

Figure 7:
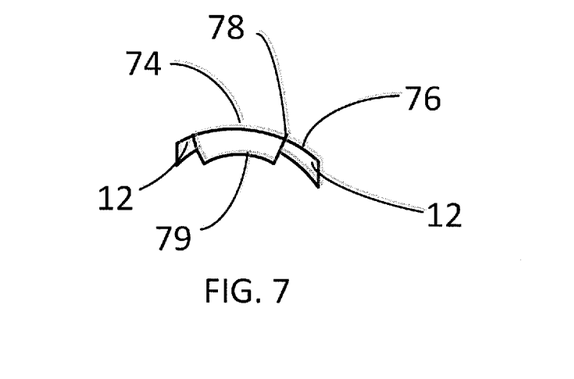
FIG. 7 is a cross sectional view of a portion of the deflector of FIG. 6 taken along broken lines C-C.

The directional vanes 72, as illustrated in FIGS. 6 and 7, may have a curved outboard surface 74 that may blend with and may have substantially the same arc or curvature as the outboard surface 76 of the ribs, spokes, or vanes 12 to which it is joined at the points of connection 78. The directional vanes 72 may further comprise an inboard surface 79 that may be directed and/or extend inboard of the inner wall 65 of the air inlet 11, and may be straight or, as illustrated in FIG. 7, curvilinear, and may direct air radially inboard of the inner wall 65 of the air inlet 11 toward the air inlet 11. When appropriately sized and positioned, the combination of directional vanes 72 with vane members 70 outboard of the inner wall 65 of the jet engine air inlet 11 may cause virtually all air that would, in connection with a jet engine 20 having no deflector 10, to strike the outer cowling of the engine and not reach the air intake 11, to be redirected generally in the direction of arrow B, substantially increasing airflow into the engine 20.

The ribs, spokes, or vanes 12 may, in cross section, be shaped as airfoils or as the guide vanes shown as element 208 of FIG. 2 of US 2010/0158684 A1, incorporated in its entirety by reference herein. Whereas the guide vanes 208 of that disclosure, however, are struts that terminate in an outer ring, the profile of the vanes or spokes of the present disclosure may be arcuate or curvilinear, i.e., semi-elliptical, semi-spherical, parabolic, hyperbolic, semi-oval, etc., in shape from fore to aft, creating the oblique angle previously described. Such an embodiment is illustrated in FIG. 3.

Figure 3:
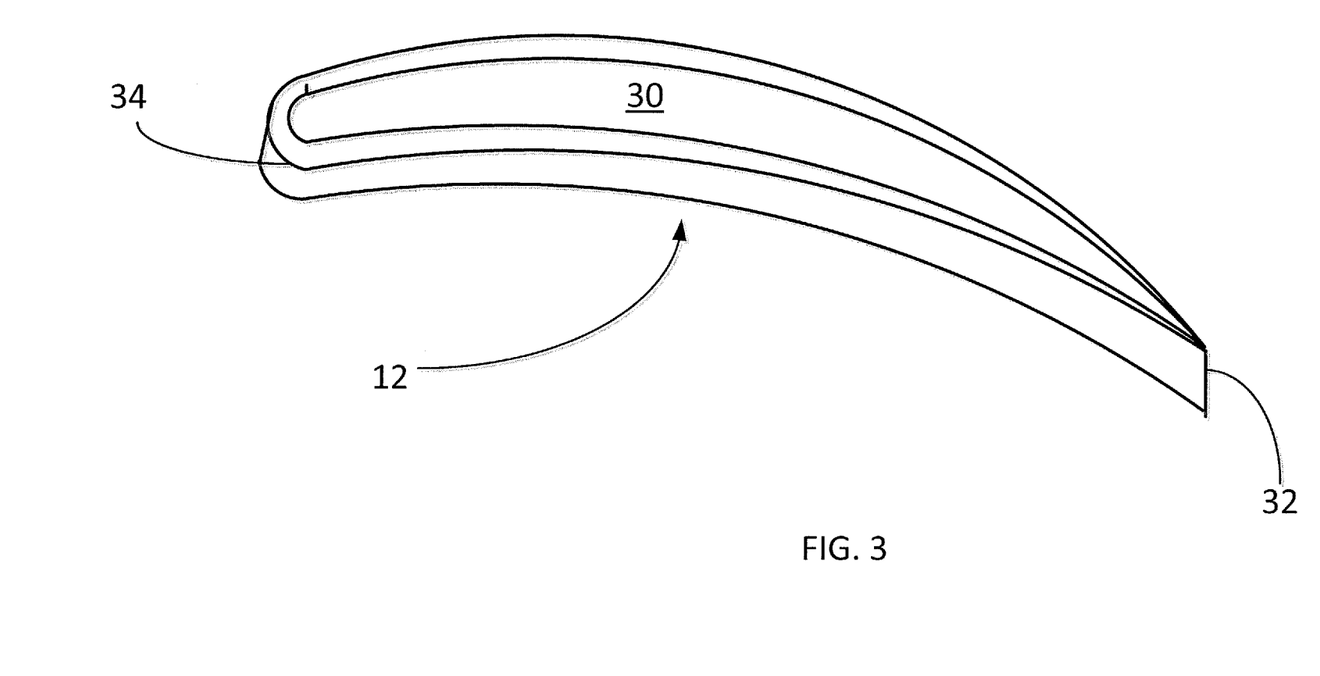
FIG. 3 is an isometric view of a deflector rib, spoke, or vane of the present disclosure.

In the embodiment of the disclosure illustrated in FIG. 3, the ribs, spokes, or vanes 12 may have a generally hollow interior region 30, which may serve to reduce the weight of the ribs, spokes, or vanes 12. As further illustrated, the ribs, spokes, or vanes 12 may be shaped with a narrow forward section 32 that widens to a curved aft section 34. The rib, spoke, or vane embodiments of FIG. 3 may be oriented about the jet engine inlet 11 generally like stator vanes, and may create a change in tangential velocity of the incoming air, as well as increasing that velocity through a nozzle effect caused by proximity of the ribs, spokes, or vanes 12 to adjacent ribs, spokes, or vanes 12. The effect of this orientation of the ribs, spokes, or vanes 12 may be to change the direction of incoming air from a direction generally normal to the air inlet to a direction that is at least partially rotational relative to the air inlet, thereby providing a change in the tangential momentum of the air, causing a torque on the rotor in the direction of rotation. The ribs, spokes, or vanes 12 may also be oriented so as to have an angular pitch in order to improve air intake and/or tangential air velocity.

Figure 5:
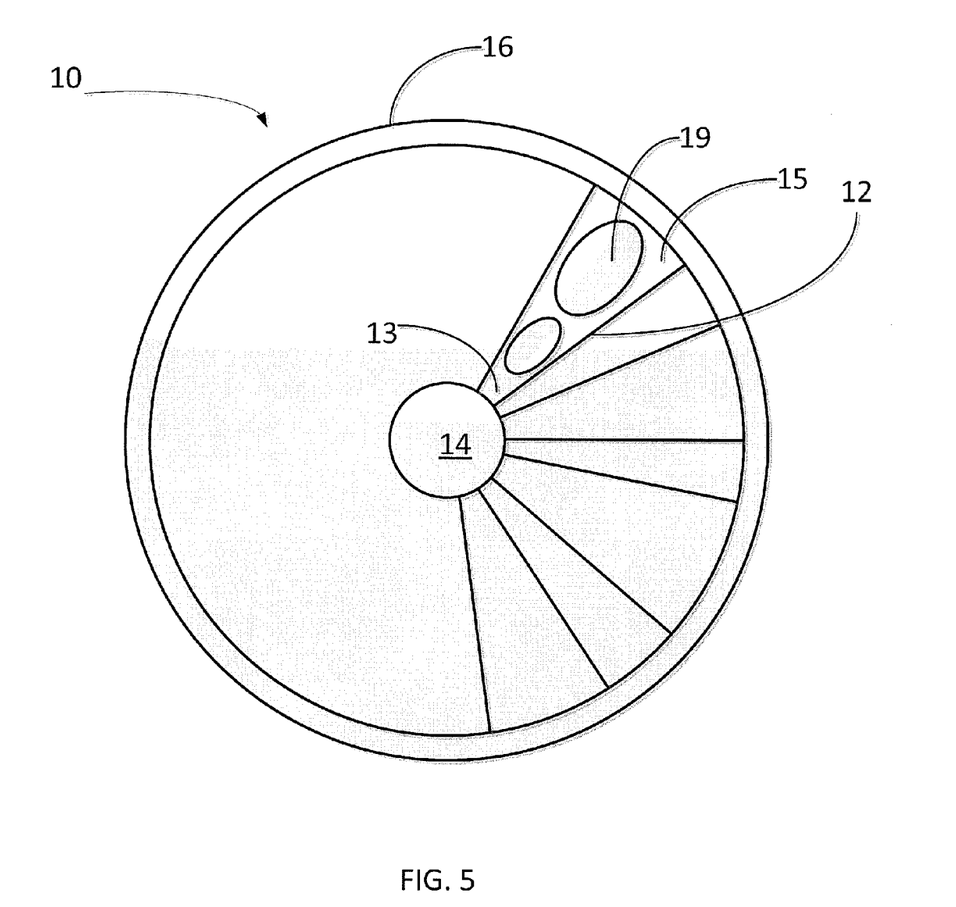
FIG. 5 is a schematic representation of a portion of a front plan view of another deflector of the present disclosure.

In another embodiment of the disclosure, the ribs, spokes, or vanes 12 are not oriented in a spiral configuration. Rather, the ribs, spokes, or vanes 12 may be curvilinear in only one plane, and thus may appear to have straight edges when the deflector 10 is viewed from the front, as illustrated schematically in FIG. 5, and may further appear curvilinear, e.g., semi-circular, semi-ellipsoidal, parabolic, hyperbolic, and/or semi-oval, when the deflector 10 is viewed from the side. Straight ribs, spokes, or vanes 12 such as illustrated in FIG. 5 may also employ a relatively narrow fore section 13 transitioning to a wider aft section 15, and/or a relatively thicker region 50 proximate the fore end 52, transitioning to a relatively thinner region 54 proximate the aft end 56 of the deflector 10, and may further include one or more air inlet holes 19, which may include direction side walls 22, as previously described.

The ribs, spokes, or vanes 12 are not shown to scale, or with the optimal number of ribs, spokes, or vanes that might be present on a jet engine according to the present disclosure, and the curvatures and proportions shown may be somewhat exaggerated for visual clarity. It will now be readily apparent to those of ordinary skill in the art that the disclosure may be optimized to minimize weight, and maximize air intake, while maintaining adequate strength of the deflector to resist bird strikes and ingestion of other flying debris.

Whether the ribs, spokes, or vanes 12 are curvilinear in one or two planes, it may be advantageous for the ribs, spokes, or vanes to have an aerodynamic and/or airfoil-shaped cross section, similar to that of a turbine blade or a stator, although the ribs, spokes, or vanes may, for example, be round, oval, square, rectangular, or triangular in cross section as well. FIGS. 4A-C represent a few possible, but by no means only, aerodynamic and/or airfoil cross sectional shapes of the ribs, spokes, or vanes as taken along the view represented by broken arrow lines B-B of FIG. 2. When such configuration is used, the ribs, spokes, or vanes 12 may include a leading edge 40 and a trailing edge 42 designed to permit maximum flow of air around the spoke or vanes 12 and reduce drag, as illustrated by the arrows representing splitting of the airflow around the ribs, spokes, or vanes 12. The ribs, spokes, or vanes 12 may be positioned or angled such that the leading edge 40 may be positioned slightly outboard with respect to the trailing edge 42, as best seen in FIGS. 1 and 2.

Jets often strike birds at a relatively high velocity associated with takeoff, e.g. 200 knots calibrated air speed or greater, and the impact of such strikes, in addition to causing catastrophic engine failure, has been known to seriously damage other structures of the plane, for example, shattering windshields and rupturing the fuselage. Because of the speed with which a jet may be traveling upon impact in a bird strike, and given the potential for striking large birds such as geese, albatross, vultures, ducks, etc., the deflector 10 may be designed to maximize impact strength while minimizing added weight to the engine. Accordingly, the ribs, spokes, or vanes 12 may be fabricated from carbon-fiber composite, or other known material in the aerospace industry, including by way of example aluminum, titanium, and alloys thereof, and resin-impregnated Kevlar® fabric or fibers, and the like.

As ballistic materials such as Kevlar® fiber and fabric are sometimes used as an engine wrap to contain turbine blades, preventing them from puncturing the jet's cabin in a blade-out scenario, the same material may be advantageously used in fabricating the deflector 10 and its components as will now be appreciated by those of ordinary skill in the art. As will also now be appreciated, when the ribs, spokes, or vanes 12 have a multiple curve configuration, being curvilinear in at least two planes, e.g., elliptical in side profile as illustrated in FIG. 2, and spiral in front plan view as illustrated in FIG. 1, such multiple bends, particularly when metal is used, may increase the strength of the ribs, spokes, or vanes 12 relative to those that are merely straight rods or curvilinear in only one plane.

The ribs, spokes, or vanes 12 may be attached directly to the frame 17 of the jet engine, or, particularly in a retrofit scenario, may be attached to an attachment ring 16 using appropriate fasteners or other attachment methods. When an attachment ring 16 is used, it may be fabricated of the same material as the ribs, spokes, or vanes 12, or a different material. When the same material is used, e.g., carbon-fiber composite, the attachment ring 16 may be fabricated as a unitary piece with the ribs, spokes, or vanes 12 and the central hub 14. Due to molding constraints, it may be necessary, in order to mold the attachment ring 16, ribs, spokes, or vanes 12, and central hub 14 together, to mold the deflector in two or more sections which may then be joined together. If the deflector 10 or its various components are molded, the molding process may create an opportunity to incorporate heating elements within the structures of the deflector 10, such as the ribs, spokes, or vanes 12, and/or central hub 14, which heating elements may be used for deicing purposes.

If metal, e.g., titanium or an alloy thereof, is used for the ribs, spokes, or vanes 12, central hub 14, and/or attachment ring 16, the components may be connected using known methods such as welding or riveting, or the deflector 10 may be cast as a unitary piece. If metal components are used for the deflector 10, deicing heating elements may be incorporated within channels or grooves in the various deflector components or fastened to an outer surface of the components using known techniques. The attachment ring 16 may be fastened to the frame of the jet engine with fasteners, 17, such as bolts 21, for ease of installation and removal for engine maintenance.

The central hub 14 may comprise a solid or hollow structure in the shape of a truncated cone, having a blunt, rounded frontal surface 18 as illustrated in FIG. 2, and may be fabricated of the same material as the ribs, spokes, or vanes 12, or a different material. If the deflector 10 is fabricated of a moldable material, such as carbon-fiber composite, the ribs, spokes, or vanes 12 and central hub 14 may be molded as a single unit. If metal is used, the ribs, spokes, or vanes 12 may be welded or riveted to the central hub 14. The central hub may, particularly in a molded configuration of the deflector 10, merely comprise the central point of joinder of all of the ribs, spokes, or vanes 12, and thus may not appear as a separate component, and may have a small or even no discernible diameter.

It is appreciated that any deflector 10 placed fore of a jet engine inlet may tend to reduce the volume of air flowing into the inlet, with consequent loss of engine efficiency, thrust, fuel economy, etc. It may, therefore, be necessary to increase the diameter of the jet engine air intake in order to account for any decrease in air intake associated with mounting the deflector 10 to the engine. The configuration as taught by the present disclosure may, however, tend to minimize the amount of air that is deflected from the air inlet, by virtue of the configuration of the ribs, spokes, vanes, and/or central hub, the air inlet openings and holes, and the shape and orientation thereof as disclosed herein.

While the deflector of the present disclosure has been illustrated mounted to a jet engine having a circular air inlet opening, consistent with many commercial aircraft, it will now be appreciated that the deflector as described herein may be mounted to jet engines of any inlet configuration, including without limitation four-sided, D-shaped, triangular, or oval shaped air inlets. The deflector 10 may, in such applications, be sized and configured to conform to the shape of the air inlet opening, for example, by configuring the aft end of the ribs, spokes, or vanes to be spaced around the air inlet opening and/or by providing an attachment ring sized and configured to conform to the size and shape of the air inlet opening.

Although the deflector of the present disclosure has been described primarily with respect to jet engines for aircraft, it is intended that the disclosure and appended claims may apply to other applications, e.g., use of the deflector with gas turbines for power generation, with propeller engines of aircraft, and generally with any air inlet where ingestion of birds and other airborne debris is to be avoided.

It will now also be appreciated that deflectors such as disclosed herein may be modified to be retractable with respect to the jet engines to which they may be mounted, to permit retraction of the deflector once the airplane has reached an altitude above which bird strikes are highly unlikely, e.g., 10,000 feet AGL or higher. Such retraction may be achieved by disposing the rib, spoke, or vane members within the cowling of the engine and including a pusher/retractor mechanism that can motivate the ribs, spokes or vanes into position and retract them into a stowed position within the engine cowling. In such embodiment, the central hub could be dispensed with, and the ribs, spokes or vanes could be designed with fore ends that come close together and optionally interconnect upon deployment. Such a retraction mechanism might utilize the attachment ring as a motivator for the ribs, spokes, or vanes, which may be pivotally connected to the attachment ring, and may include retraction motors, outer hatch doors, and connections such as are known in the art, e.g., for retracting landing gear, wing features, and the like. Such a mechanism might further include straight, or in the case of spiral shaped ribs, spokes, or vanes, spiral grooves within the engine cowling to direct and retain the ribs, spokes, or vanes in the proper alignment upon deployment.

This written description uses examples to disclose the invention, including the best mode, and also to enable any person of ordinary skill in the art to practice the invention, including making and using any devices or systems and performing any incorporated methods. The steps recited in the accompanying method claims need not be taken in the recited order, where other orders of conducting the steps to achieve the desired result would be readily apparent to those of ordinary skill in the art. The patentable scope of the invention is defined by the claims, and may include other examples that occur to those of ordinary skill in the art. Such other examples are intended to be within the scope of the claims if they have structural elements that do not differ from the literal language of the claims or if they include equivalent structural elements with insubstantial differences from the literal languages of the claims.

I claim:

1. A jet engine with an air inlet deflector, the air inlet deflector comprising a curvilinear member that is curvilinear in at least two planes of view, the curvilinear member including a thickness in a radial direction that transitions from a thicker fore section to a thinner aft section and is connected at its rearward end to the jet engine.

2. The jet engine of claim 1 wherein the curvilinear member increases in width from fore to aft.

3. The jet engine of claim 1, the jet engine comprising an air inlet, the curvilinear member comprising an airfoil-shaped cross section having a leading edge and a trailing edge, the curvilinear member having a fore end and an aft end, the aft end being attached to the jet engine proximate the air inlet thereof, the leading edge being positioned outboard with respect to the trailing edge.

4. The jet engine of claim 1 wherein the air inlet deflector is molded as a unitary piece.

5. The jet engine of claim 4 wherein the air inlet deflector includes a heating element molded therein.

6. The jet engine of claim 1 wherein the curvilinear member comprises an air inlet opening.

7. The jet engine of claim 6 wherein the air inlet opening comprises a directional side wall.

8. The jet engine of claim 7 wherein the directional side wall comprises a tapered configuration.

9. The jet engine of claim 6 wherein the curvilinear member comprises a vane member extending inboard of the air inlet opening.

10. A jet engine with an air inlet deflector, the air inlet deflector having a forward end and an aft end, the forward end having a thickness in a radial direction that transitions from a thicker fore section to a thinner aft section, thereby providing greater impact strength in the thicker fore section relative to other regions of the air inlet deflector.

11. The jet engine of claim 10, the air inlet deflector comprising a rib having a forward end and an aft end, the forward end of the rib having greater impact strength relative to other regions of the rib.

12. The jet engine of claim 11, the rib having a thicker region proximate the forward end of the rib and a thinner region proximate the aft end of the rib and gradually increasing in width from the forward end to the aft end.

13. A jet engine comprising an air inlet deflector, the jet engine having an air inlet with an inner wall, the air inlet deflector comprising a portion positioned outboard of the inner wall that directs air inboard of the inner wall, the portion positioned outboard of the inner wall comprising a rib having an air inlet opening outboard of the inner wall, the air inlet opening having directional sidewalls configured to redirect air from a direction substantially normal to the air inlet and outboard thereof to a direction with a radial component and inboard of the inner wall.

14. The jet engine of claim 13 wherein the air inlet deflector comprises a vane member outboard of the inner wall that directs air inboard of the inner wall.

* * * * *